US007934003B2

(12) United States Patent
Carusi et al.

(10) Patent No.: US 7,934,003 B2
(45) Date of Patent: *Apr. 26, 2011

(54) METHOD AND SYSTEM FOR MONITORING PERFORMANCE OF DISTRIBUTED APPLICATIONS

(75) Inventors: Francesco Carusi, Rome (IT); Vincenzo Sciacca, Rome (IT)

(73) Assignee: International Business Machines Corporation, Armonk, NY (US)

( * ) Notice: Subject to any disclaimer, the term of this patent is extended or adjusted under 35 U.S.C. 154(b) by 241 days.

This patent is subject to a terminal disclaimer.

(21) Appl. No.: 12/132,099

(22) Filed: Jun. 3, 2008

(65) Prior Publication Data
US 2008/0262797 A1  Oct. 23, 2008

Related U.S. Application Data

(63) Continuation of application No. 10/687,255, filed on Oct. 16, 2003, now Pat. No. 7,401,141.

(30) Foreign Application Priority Data
Jan. 7, 2003  (EP) ..................................... 03368003

(51) Int. Cl.
G06F 15/16 (2006.01)
G06F 15/173 (2006.01)

(52) U.S. Cl. .......... 709/228; 709/22; 709/203; 709/223; 709/224; 709/225; 709/227; 709/229

(58) Field of Classification Search ........... 709/223–225
See application file for complete search history.

(56) References Cited

U.S. PATENT DOCUMENTS

| 4,914,571 A | 4/1990 | Baratz et al. |
| 5,708,780 A | 1/1998 | Levergood et al. |
| 5,796,952 A | 8/1998 | Davis et al. |
| 5,812,776 A | 9/1998 | Gifford |
| 6,021,439 A | 2/2000 | Turek et al. |
| 6,023,722 A | 2/2000 | Colyer |
| 6,041,352 A | 3/2000 | Burdick et al. |
| 6,070,190 A | 5/2000 | Reps et al. |
| 6,108,700 A | 8/2000 | Maccabee et al. |
| 6,119,165 A | 9/2000 | Li et al. |

(Continued)

OTHER PUBLICATIONS

Haworth, "Service Management Using the Application Response Measurement API Without Application Source Code Modification", Jun. 1997, pp. 1-7, retrieved Sep. 14, 2007. http://regions.cmg.org/regions/cmgarmw/shortarm.html.

(Continued)

Primary Examiner — Hassan Phillips
Assistant Examiner — Lin Liu
(74) Attorney, Agent, or Firm — Yee & Associates, P.C.; Jeffrey S. LaBaw

(57) ABSTRACT

Method and system for performance monitoring of distributed applications. A sensor intercepts every request of service for a server that is generated on a client. If the request meets a filtering condition (for example, defined by the address of the server, the web page from which the request is originated and/or the selected link) the measuring of a corresponding transaction on the client is enabled; at the same time, the request is updated by inserting a correlator. The request is then transmitted to the server. If the request includes the correlator, the measuring of a sub-transaction originating from the request is also enabled on the server. The parameters measured on the client and on the server are then associated with the correlator.

3 Claims, 7 Drawing Sheets

U.S. PATENT DOCUMENTS

| | | | |
|---|---|---|---|
| 6,138,155 A | 10/2000 | Davis et al. | |
| 6,240,456 B1 | 5/2001 | Teng et al. | |
| 6,286,046 B1 * | 9/2001 | Bryant | 709/224 |
| 6,289,378 B1 | 9/2001 | Meyer et al. | |
| 6,298,446 B1 | 10/2001 | Schreiber et al. | |
| 6,434,626 B1 | 8/2002 | Prakash et al. | |
| 6,438,125 B1 * | 8/2002 | Brothers | 370/352 |
| 6,438,592 B1 | 8/2002 | Killian | |
| 6,477,571 B1 | 11/2002 | Ross | |
| 6,487,590 B1 | 11/2002 | Foley et al. | |
| 6,779,039 B1 * | 8/2004 | Bommareddy et al. | 709/238 |
| 6,983,379 B1 | 1/2006 | Spalink et al. | |
| 6,990,521 B1 | 1/2006 | Ross | |
| 7,155,512 B2 | 12/2006 | Lean et al. | |
| 2002/0099812 A1 | 7/2002 | Davis et al. | |
| 2002/0099818 A1 | 7/2002 | Russell et al. | |
| 2002/0161793 A1 * | 10/2002 | Stahl | 707/500 |
| 2002/0169868 A1 | 11/2002 | Lopke et al. | |
| 2003/0217130 A1 | 11/2003 | Tang et al. | |
| 2004/0073653 A1 | 4/2004 | Hunt et al. | |
| 2004/0122942 A1 | 6/2004 | Green et al. | |
| 2004/0215762 A1 | 10/2004 | Oulu et al. | |
| 2005/0107985 A1 | 5/2005 | Agrawal et al. | |
| 2007/0121626 A1 | 5/2007 | Shepard | |

OTHER PUBLICATIONS

Johnson, "The Application Response Measurement (ARM) API, Version 2", Tivoli Systems, Dec. 1997, retrieved Dec. 7, 2007 http://regions.cmg.org/regions/cmgarmw/marcarm.pdf.

* cited by examiner

METHOD AND SYSTEM FOR MONITORING PERFORMANCE OF DISTRIBUTED APPLICATIONS This application is a continuation of application Ser. No. 10/687,255, filed Oct. 16, 2003, now U.S. Pat. No. 7,401,141 status allowed.

TECHNICAL FIELD

The present invention relates to the data processing field, and more specifically to a method and a corresponding system for monitoring performance of distributed applications.

BACKGROUND ART

Distributed applications have become increasingly popular in the last years, particularly following the widespread diffusion of the Internet. In a distributed application, client computers access resources managed by server computers through a network. A typical example is that of an e-business application, wherein a user may download a login page, fill-in a form with his/her username and password, and then receive information (for example, about a personal bank account) from the server.

Tools for monitoring performance of distributed applications play a key role in their management. Particularly, a system administrator can get instantaneous notification when a user is experiencing any problem (so that appropriate steps can be taken to remedy the situation); alternatively, the collected information can be logged and accurate counts tracked over time. For example, the information provided by the monitoring performance tools is essential for service level agreements or for threshold and/or availability monitoring; moreover, the same information is very useful to measure workloads for capacity planning and charge-back accounting.

However, these tools (like any measurement systems) inevitably interfere with the quantities under measure; therefore, the correct tuning of the performance monitoring tools is of the utmost importance, in order to avoid adversely affecting operation of the whole system.

A solution known in the art for monitoring performance of distributed applications is provided by the Application Response Measurement (ARM) standard, as described in "The Application Response Measurement (ARM) API, Version 2", Mark W. Johnson, Tivoli Systems, December 1997. The standard defines some API calls, which can be used to ask an agent to measure transactions and to make the information available to management applications. In this way, an accurate picture of the actual workload of the system can be obtained.

The ARM standard also supports the use of correlators, which provide child/parent information needed to trace how transactions and corresponding sub-transactions relate to each other. The correlators are very useful to breakdown the complexity of the distributed application, so as to facilitate the analysis of the collected information. For example, when a transaction is slow it is possible to know which sub-transaction(s) contribute most to the delays.

A distributed application must be correctly instrumented for monitoring its performance using the ARM standard. First of all, this procedure requires the identification of the key transactions to be monitored. The distributed application is then modified by embedding calls to the ARM APIs where necessary.

However, the solution described above is very rigid since the key transactions must be defined statically. The cited document only suggests a technique for exploiting the format of the correlators so as to use the tracing selectively (for example, when the response time of a client begins to be unacceptable) However, once the calls to the ARM APIs have been inserted into the distributed application, no way is provided for controlling the transactions to be monitored dynamically; conversely, any change requires the updating of the corresponding source code and its deployment to the different (client and server) computers where the distributed application is running.

Therefore, a wrong selection of the key transactions can be detrimental to the operation of the whole system. Particularly, when few transactions are selected the collected information may be useless; conversely, monitoring a great number of transactions may result in application delays and system overhead.

Moreover, the instrumentation of the distributed application is not a tenable option when its source code is not available. This drawback is particular acute for pre-loaded or packaged applications; a typical example is that of the browsers that are installed on millions of clients for accessing the Internet.

A different solution for monitoring performance of distributed applications where source code changes are not possible is described in "Service management using the application response measurement API without application source code modification", Martin Haworth, Resource and Performance Management Solutions Network and System Management Division, Hewlett-Packard Company, June 1997. This article proposes capturing a script by recording the user actions on the client, for example, by means of a Remote Terminal Emulation (RTE) technique. The user script is edited to include calls to the ARM APIs for each desired transaction. The user script can then be scheduled to run at an appropriate interval.

However, the proposed technique only provides an emulation scenario, wherein the performance parameters that are measured are always artificial in nature. Therefore, this solution is very limited in that it cannot provide an accurate picture of the performance of the real transactions.

SUMMARY OF THE INVENTION

It is an object of the present invention to provide a method and a corresponding system for monitoring performance of distributed applications, which method and system support a dynamic control scheme.

It is another object of the present invention to provide a simple and flexible solution for selecting the transactions to be monitored.

It is yet another object of the present invention to facilitate the tuning of the performance monitor process.

The accomplishment of these and other related objects is achieved by a method of monitoring performance of distributed applications including the steps of: a client computer originating a request of service for a server computer, if the request meets at least one predefined condition, enabling the measuring on the client computer of at least one performance parameter for a transaction corresponding to the request and updating the request by inserting a correlation identifier, transmitting the request to the server computer, if the request includes the correlation identifier, enabling the measuring on the server computer of the at least one performance parameter for a sub-transaction originating from the request, executing the sub-transaction, associating the correlation identifier with the at least one performance parameter measured on the server computer, and associating the correlation identifier with the at least one performance parameter measured on the client computer.

The present invention also provides different computer programs for performing the method, together with corresponding products storing the programs. Furthermore, a data processing system for monitoring performance of distributed applications, a client computer and a server computer for use in the system are also encompassed.

The novel features believed to be characteristic of this invention are set forth in the appended claims. The invention itself, however, as well as these and other related objects and advantages thereof, will be best understood by reference to the following detailed description to be read in conjunction with the accompanying drawings.

DETAILED DESCRIPTION OF THE PREFERRED EMBODIMENT

Figure 1A:
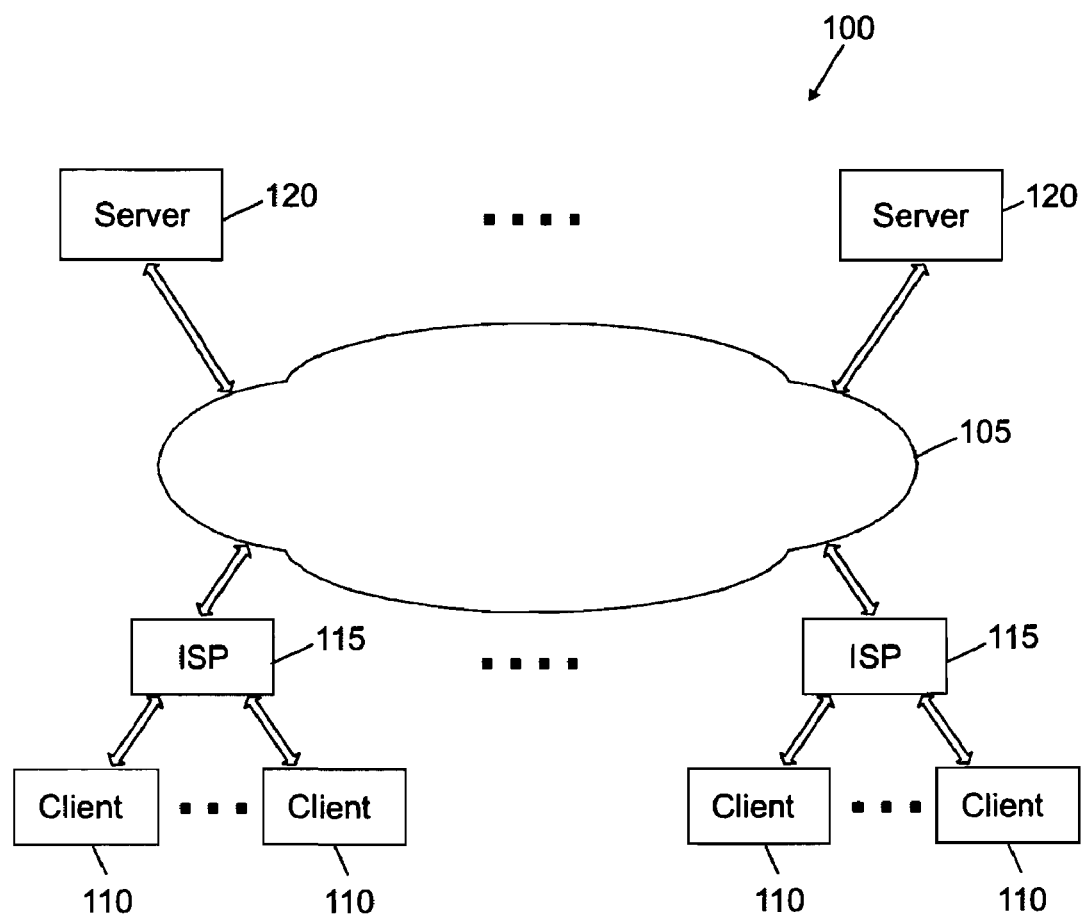
FIG. 1a is a schematic block diagram of a data processing system in which the method of the invention can be used.

With reference in particular to FIG. 1a, a data processing system 100 with a distributed architecture based on the Internet is shown. The Internet is formed by millions of computers, which are connected to each other through a network infrastructure 105; each computer is uniquely identified by a corresponding IP address. Client computers 110 get into the Internet through associated Internet Access Providers (ISPs) 115; access to the Internet allows users of the clients 110 to exploit shared resources supported by server computers; for example, the users can exchange information, send and receive e-mails, and view documents. A particular subsystem of servers 120 (the World Wide Web) manages hypertext documents, known as web pages; each web page is formatted in the HTML, a language that supports links to other documents, as well as graphics, audio, and video files. The web uses the HTTP protocol, which defines how messages are structured and transmitted, and what actions the clients 110 and the servers 120 should take in response to various commands.

Figure 1B:
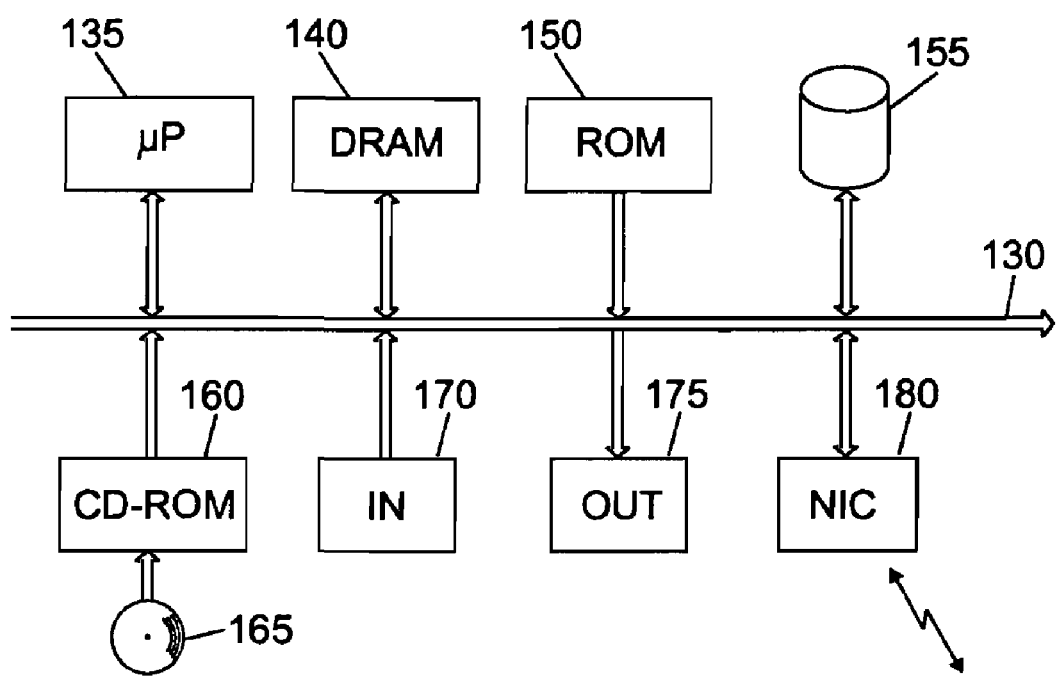
FIG. 1b depicts the functional blocks of a generic computer of the system.

As shown in FIG. 1b, a generic computer of the system (client or server) is formed by several units that are connected in parallel to a communication bus 130. In detail, a microprocessor (μP) 135 controls operation of the computer, a Random Access Memory (RAM) 140 is directly used as a working memory by the microprocessor 135, and a Read Only Memory (ROM) 150 stores basic code for a bootstrap of the computer. Several peripheral units are further connected to the bus 130 (by means of respective interfaces). Particularly, a mass memory consists of a magnetic hard-disk 155 and a driver 160 for reading CD-ROMs 165. Moreover, the computer includes input devices 170 (for example, a keyboard and a mouse), and output devices 175 (for example, a monitor and a printer). A network Interface Card (NIC) 180 is used to connect the computer to the network infrastructure.

However, the concepts of the present invention are also applicable when the system has another architecture (for example, based on a Local Area Network or LAN), or when each computer has a different structure or includes other units. Similar considerations apply if the shared resources are managed by a single server, if the system includes nodes operating alternatively either as clients or as servers, if proxy computers and/or gateway computers are provided, and the like.

Figure 2:
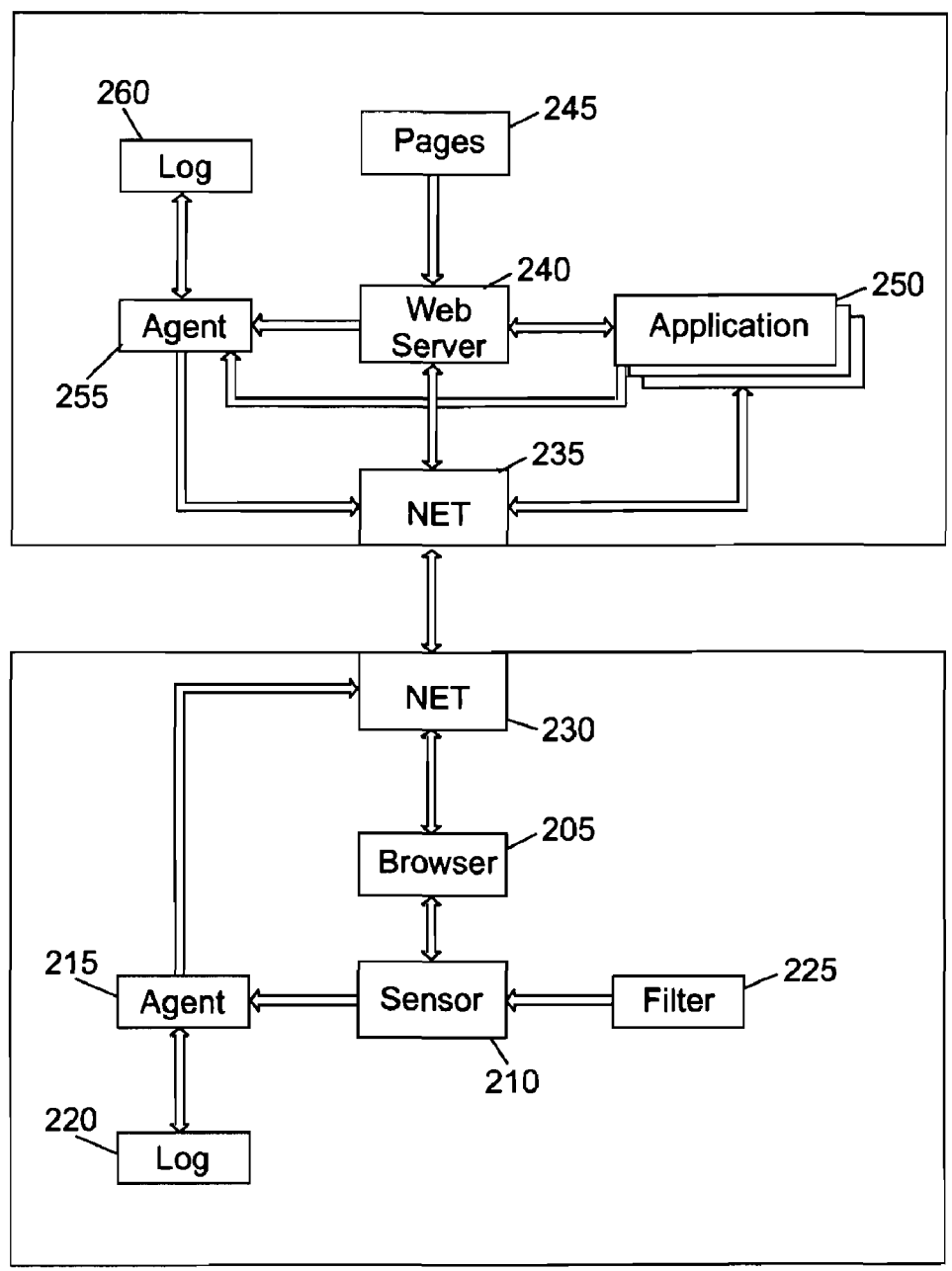
FIG. 2 shows a partial content of the working memories of a client and of a server in the system.
Figure 3A:
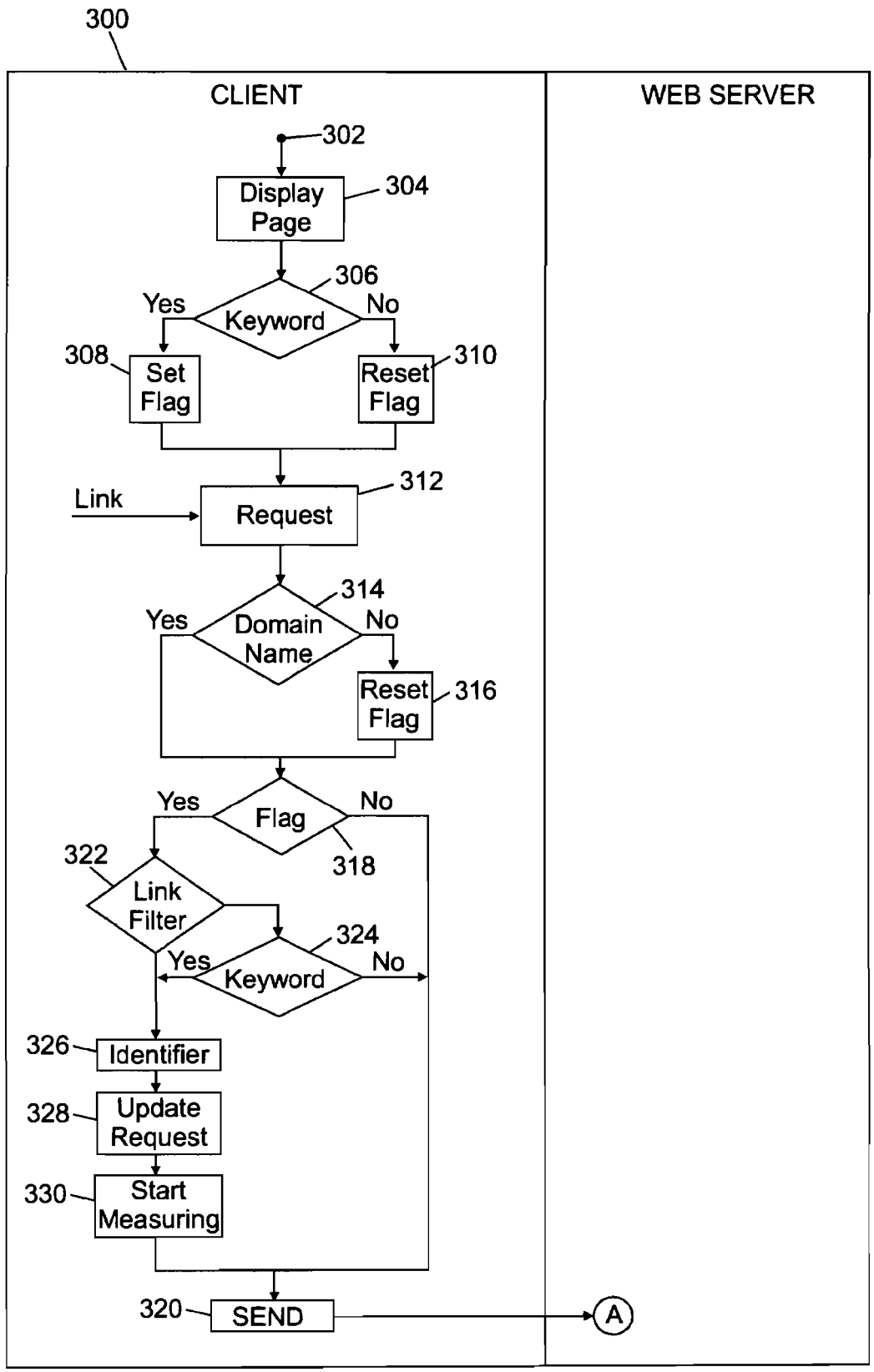
FIGS. 3a-3d illustrate an activity diagram describing the execution of a transaction.
Figure 3B:
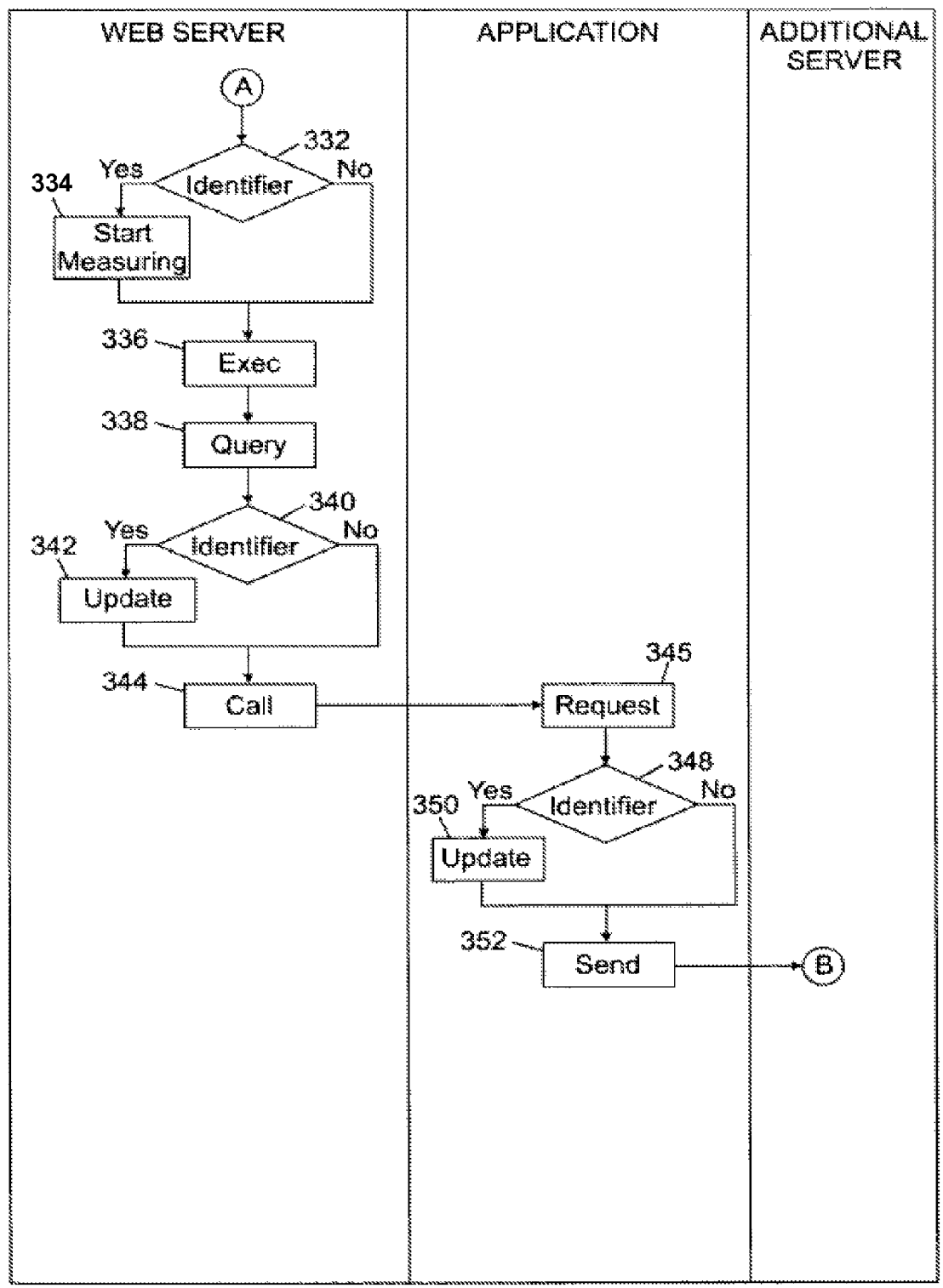
Figure 3C:
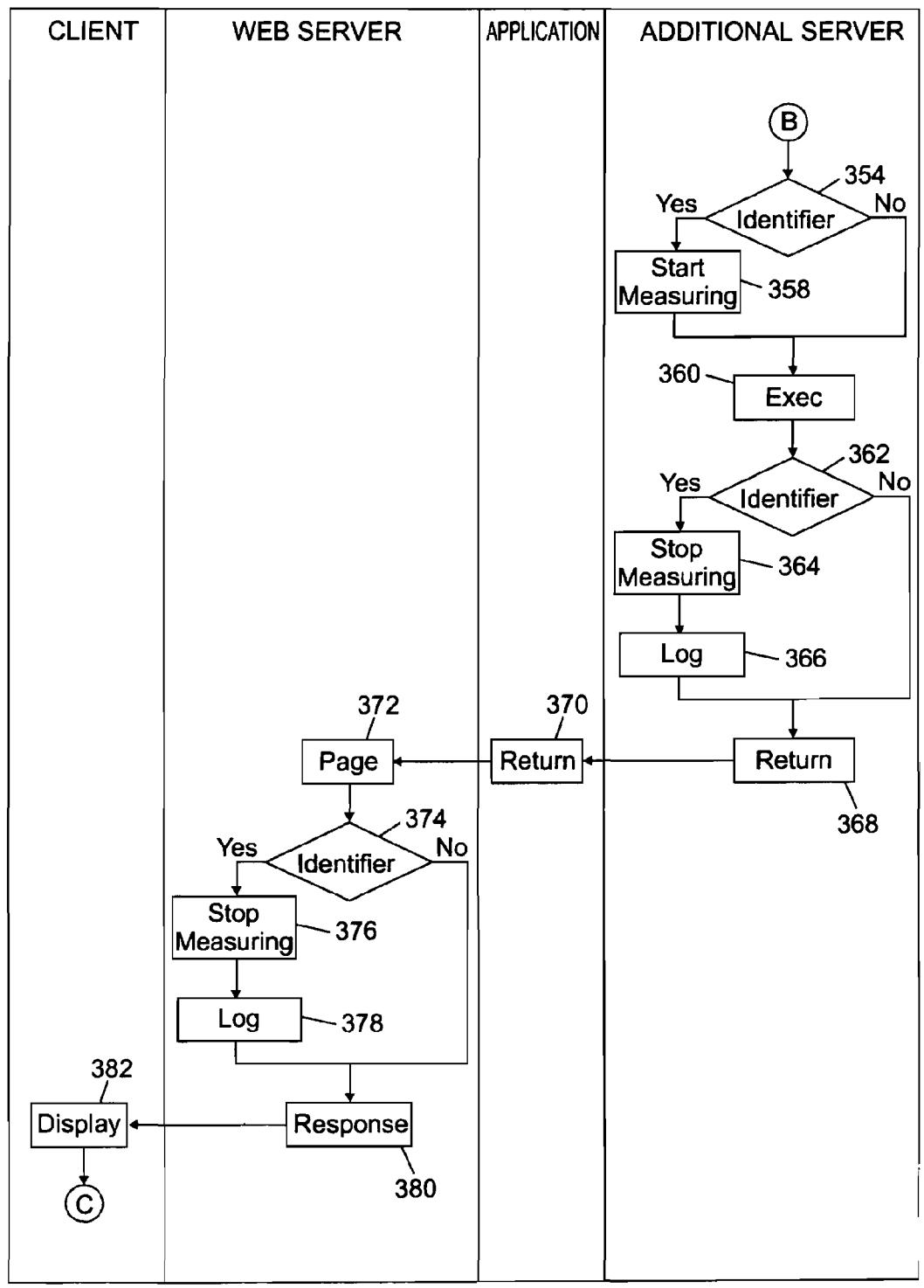
Figure 3D:
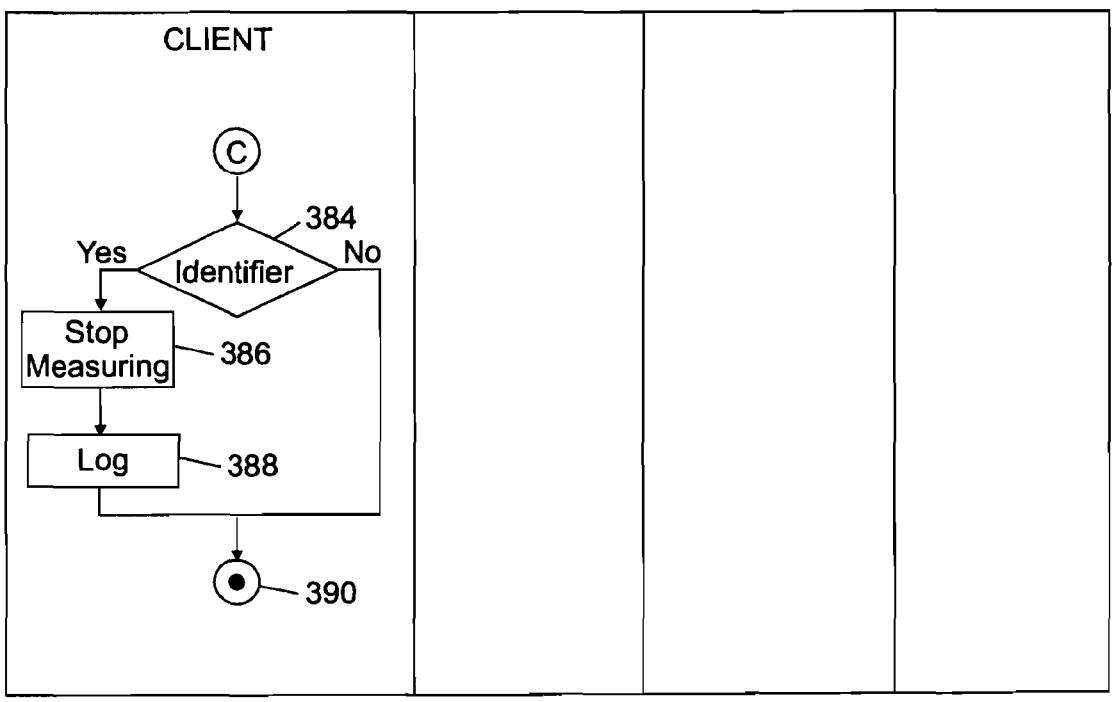

Moving now to FIG. 2, a partial content of the working memories of a generic server and of a generic client is shown; the information (programs and data) is typically stored on the respective hard-disks and loaded (at least partially) into the working memories when the programs are running, together with an operating system and other application programs (not shown in the figure). The programs are initially installed onto the hard disks from CD-ROMs.

A browser 205 allows a user of the client to surf the Internet, in order to download and display web pages from selected servers. Each web page is identified by a global name, known as Uniform Resource Locator (URL). The URL consists of a first part indicating the protocol to be used (for example, the HTTP) and a second part actually indicating the requested web page; the web page is selected by means of a domain name (identifying one or more IP addresses), possibly followed by the path to the requested web page.

Any request of the user causes the execution of a transaction. The transaction consists of a sequence of information exchanges and related operations that are required to satisfy the request; the transaction ends with the return of a response to the user. The transaction must be completed substantially immediately, and in any case in a reasonable amount of time to allow an interaction of the user with the system.

The browser 205 generates a HTTP request for the transaction, which is redirected to a sensor 210. The sensor 210 controls a monitoring agent 215. The monitoring agent 215 measures one or more performance parameters of the transaction (for example, its duration) directly on the client; moreover, the monitoring agent 215 generates a correlator for the transaction, which is returned to the sensor 210. The measured parameter of the transaction is stored in a log 220 (together with its correlator). The sensor 210 further accesses a filter 225, which stores a predefined pattern of domain names to be monitored.

The HTTP request is modified by the sensor 220 (if necessary) inserting the correlator. The modified HTTP request is then returned to the browser 205, in order to be transmitted to the corresponding server. For this purpose, the browser 205 interfaces with a networking module 230, which processes a set of protocol layers working together for defining communication over the Internet. The networking module 230 is also coupled with the monitoring agent 215, in order to transmit the log 220 periodically (for example, every night) to a dedicated server acting as a collector of the measured parameters.

The networking module 230 establishes a connection with a corresponding module 235 running on the server to which the (modified) HTTP request is directed. The HTTP request is processed by a web server module 240. For this purpose, the web server 240 accesses a repository 245 of web pages; the web pages may be either static (when their content cannot be changed) or dynamic (when their content is defined at run-time).

Each HTTP request received by the web server 240 causes the execution of a corresponding sub-transaction (involving the requested web page to be fetched and returned to the client through the corresponding connection). Moreover, the sub-transaction may require one or more additional sub-transactions, which are performed under the control of corresponding applications 250. For example, the applications 250 retrieve information requested by the user from a database stored on the server. In addition, some sub-transactions may require the transmission of one or more additional HTTP requests to auxiliary servers (through the networking module 235); each (auxiliary) HTTP request in turn causes the execution of one or more sub-transactions, which end with the return of a response to the (main) server. The same procedure may be repeated recursively on the auxiliary servers once or more times.

The web server 240 and the applications 250 control a monitoring agent 255, which measures one or more performance parameters of each sub-transaction directly on the server. The measured parameters are stored in a log 260, together with the correlator of the parent transaction (received from the client in the HTTP request). In addition, if the sub-transaction involves the execution of nested sub-transactions, the monitoring agent 255 generates a further correlator; this correlator is associated with the measured parameters for the sub-transaction in the log 260. Moreover, the correlator is returned to the application 250, which updates the corresponding auxiliary HTTP request accordingly. The monitoring agent 255 is also coupled with the networking module 235, in order to transmit the log 260 periodically to the collector server.

Preferably, the monitoring agent 215 (on the client) and the monitoring agent 255 (on the server) support API calls conforming to the ARM standard. The ARM standard (Version 2.0) defines six APIs. Two APIs arm_init and arm_getid are typically executed only once when the module (sensor or web server) exploiting the monitoring agent initializes. The API arm_init is called passing the name of the module and returns a unique identifier thereof; the API arm_getid is called passing the identifier of the module and the name of a transaction class, and returns a unique identifier of the transaction class. A further API arm_end (receiving the identifier of the module) may be used to signal to the monitoring agent that the module is shutting down. Two APIs arm_start and arm_stop are used to monitor an actual transaction. Particularly, the API arm_start indicates that the transaction has begun execution; the API arm_start is called passing the identifier of the transaction class and returns a unique handle for the transaction. The API arm_stop instead indicates that the transaction has been completed; the API arm_stop is called passing the handle of the transaction and a value denoting its status (good, error or abort). A further API arm_update is available for signaling that a very long transaction (identified by the handle passed as a parameter) is still active.

The API arm_start may be called requesting the monitoring agent to return a correlator for the transaction. The correlator includes a flag, which is used to enable the tracing of the transaction; moreover, the correlator includes the handle of the transaction and an identifier of the computer on which the monitoring agent is running (for example, its IP address). On the same API arm_start, the module may also provide the correlator of a parent transaction. In this way, the correct child/parent relationship among different transactions can be easily traced.

For example, let us assume that a client A starts a transaction T1 requesting a correlator, which is assigned C1. The client A sends a corresponding request to a server B, and includes C1 in the request. In response thereto, the server B starts a sub-transaction T2, passing C1 as the parent correlator; at the same time, a further correlator for the sub-transaction T2 is requested and assigned C2. In turn, the server B sends a further request to a server C, and includes the correlator C2 in the request. The server C starts an auxiliary sub-transaction T3, passing C2 as the parent correlator. The total picture of the transaction can be reconstructed knowing that the transaction T1 is the parent of the sub-transaction T2 (via the correlator C1), and that the sub-transaction T2 is the parent of the sub-transaction T3 (via the correlator C2).

However, the concepts of the present invention are also applicable when the transaction originates different requests of service (each one involving the execution of alternative operations), when the HTTP request is intercepted with another technique (for example, using a hooking technology), or when other performance parameters are measured; alternatively, the ARM calls include additional information about the transaction (for example, its internal congestion, the level of resources available, or diagnostic data), or the correlators are replaced with equivalent identifiers; moreover, the monitoring agents may support calls conforming to a different version of the ARM standard or even calls conforming to another specification. Similar considerations apply if the programs are provided on any other computer readable medium (such as one or more floppy-disks), if the programs and data are structured in a different manner, if alternative modules or functions are provided, and the like. For example, the parameters measured on every computer are aggregated before being logged, or the logs are collected in a different way (or they are simply available for viewing without being transmitted periodically to the collector server); alternatively, the monitoring agents generate an alarm when significant problems occur, or a module is provided for identifying and solving the problems automatically.

Considering now FIGS. 3a-3d, a process 300 corresponding to the execution of a transaction begins at the black start circle 302 in the swim-lane of the browser. Proceeding to block 304, a web page requested by the user is downloaded on the client; the web page is then displayed on the monitor of the client at block 304. As soon as the user selects a link on the current web page (for example, clicking with the mouse on its graphical representation), a corresponding HTTP request for the corresponding server is generated.

The HTTP request is intercepted by a sensor at block 306 wherein a test is made to determine whether the HTML code defining the current web page includes a predetermined keyword for enabling the monitoring of the transactions originating therefrom. If the keyword has been found, a correlation flag is asserted at block 308; conversely, the correlation flag is deasserted at block 310. In both cases, the process merges again at block 312.

Continuing to block 314, the sensor verifies whether the domain name of the server (specified in the HTTP request) matches the filtering pattern. If not, the correlation flag is deasserted at block 316, and the process continues to block 318; conversely, the flow of activities descends into block 318 directly.

Considering now decision block 318, if the correlation flag is deasserted the process continues to block 320 (described in the following). Conversely, a test is made at block 322 to determine whether an additional filter at the level of the link is enabled. If so, the sensor verifies at block 324 whether the method specified in the HTTP request (corresponding to the definition of the link in the HTML code) includes a predetermined keyword for enabling the monitoring of the transactions originating from the link. If the keyword has not been found, the process continues to block 320. If the filter at the level of the link is not enabled (block 322) or the HTTP request includes the keyword (block 324) the process passes to block 326. In this case, the sensor requests the monitoring agent to start measuring the duration of the transaction resulting from the HTTP request (invoking the API arm_start). The API arm_start returns a handle of the transaction and a corresponding correlator at block 328. Continuing to block 330, the HTTP request is updated inserting the correlator. The flow of activity then passes to block 320.

With reference now to block 320, the HTTP request (possibly updated) is sent to the corresponding server; in this way, the (parent) correlator may be provided to the server without requiring any additional HTTP message. In response thereto, the web server verifies at block 332 whether the HTTP request includes the parent correlator. If so, the process enters block 334, wherein the web server requests the monitoring agent (running on the server) to start measuring the duration of the sub-transaction resulting from the HTTP request. For this purpose, the API arm_start is called passing the parent correlator received from the client; the API arm_start returns a handle of the sub-transaction and a corresponding correlator.

Execution of the sub-transaction is started at block 336. Let us assume that the sub-transaction at block 338 involves the call of a query on a selected application running on the server. If the parent correlator had been included in the HTTP request (decision block 340), the call is updated at block 342 adding the correlator of the sub-transaction as a further parameter.

In any case, the process then continues to block 344, wherein the query is called on the application (possibly passing the correlator). In response thereto, the process proceeds to block 345 in the swim-lane of the application; assuming that the query involves the execution of a further sub-transaction on an auxiliary server, the application generates a corresponding HTTP request. A test is then made at decision block 348 to verify whether the correlator has been passed to the application in the call. If so, the process enters block 350 wherein the auxiliary HTTP request is updated adding the correlator; the process then continues to block 352. Conversely, the flow of activities descends into block 352 directly.

Moving to block 352, the auxiliary HTTP request (possibly updated) is sent to the corresponding server. In response thereto, a test is made at decision block 354 (in the swim-lane of the auxiliary server) to determine whether the auxiliary HTTP request includes the (parent) correlator. If so, the process enters block 358 wherein the monitoring agent (on the auxiliary server) is requested to start measuring the duration of a further sub-transaction originating from the auxiliary HTTP request; the process then continues to block 360. Conversely, the flow of activities descends into block 360 directly.

The operations involved by the auxiliary HTTP request are then executed at block 360. As soon as the corresponding sub-transaction has been completed, if the parent identifier had been included in the auxiliary HTTP request (decision block 362) the blocks 364-366 are executed; in any case, the process then continues to block 368 (described in the following). Particularly, at block 364 the monitoring agent is requested to stop measuring the duration of the auxiliary sub-transaction; for this purpose, the API arm_stop is called passing the handle of the sub-transaction (returned by the API arm_start). The measured parameter is then logged at block 366, together with the parent correlator.

Considering now block 368, the result of the sub-transaction executed on the auxiliary server is returned to the application running on the (main) server. The process continues to block 370, wherein the application in turn returns this result to the web server. With reference now to block 372 in the swim-lane of the web server, a dynamic web page including the returned information is generated. If the parent correlator had been included in the HTTP request received from the client (decision block 374), the blocks 376-378 are executed; in any case, the process then continues to block 380 (described in the following). Particularly, at block 376 the monitoring agent is requested to stop measuring the duration of the sub-transaction (calling the API arm_stop and passing the handle of the sub-transaction); the measured parameter is then logged at block 378, together with the correlator and its parent correlator.

With reference now to block 380, the web page so generated is returned to the browser. In response thereto, the web page is displayed on the monitor of the client at block 382 (in the swim-lane of the browser). As soon as the transaction has been completed, the process continues to decision block 384 in the swim-lane of the sensor. If the correlator had been included in the HTTP request, the blocks 386-388 are executed. Particularly, at block 386 the monitoring agent is requested to stop measuring the duration of the transaction (calling the API arm_stop and passing the handle of the transaction); the measured parameter is then logged at block 388, together with its correlator. In any case, the process ends at the concentric white/black stop circles 390.

For example, the current web page displayed on the client is defined by the following HTML code:

```
<HTML>
<HEAD>
<META name="Correlation" content="Enabled">
...
</HEAD>
<BODY>
<A HREF="http://MyDomainName/MyDestinationPage?Correlation=Enabled">
Click here</A>
</BODY>
</HTML>
```

The HTML code starts with the <HTML> tag and ends with the </HTML> tag. The definition of what the web page is about is put in a header between the <HEAD> and </HEAD> tags. All the information to be included in the web page fits in a body between the <BODY> and </BODY> tags. In the example at issue, the header includes a meta field called "Correlation"; the meta field, when enabled, specifies that the transactions originating from the web page must be monitored. Moreover, the web page includes a link to an anchor destination defined by the following URL:

"http://MyDomainName/MyDestinationPage"
(wherein "MyDomainName" is the domain name and "MyDestiantionPage" is the location of the requested web page). The parameter "?Correlation=Enabled" added to the URL specifies that the specific transaction originating from the link must be monitored.

When the user selects this link, the following HTTP request is generated:

```
GET <SP>
http://MyDomainName/MyDestinationPage?Correlation=Enabled <SP>
HTTP_Version <CRLF>
<CRLF>
<CRLF>
```

The HTTP request consists of header fields and an entity body, which are separated by a null line (CRLF). The header fields specify that the method GET is requested to retrieve the web page identified by the URL:

"MyDomainName/MyDestinationPage"
(the parameter ?Correlation=Eanbled" is discharged by the web server).

If the domain name "MyDomainName" matches the filtering pattern, the HTTP request is modified inserting a new field "CORR" specifying the value of the correlator (for example, "MyCorrelator"):

```
GET <SP>
http://MyDomainName/MyDestinationPage?Correlation=Enabled <SP>
HTTP_Version <CRLF>
CORR: "MyCorrelator" <CRLF>
<CRLF>
<CRLF>
```

Likewise, the following HTML code defines a current web page that is used to submit a form to the web server:

```
<HTML>
<HEAD>
<META name="Correlation" content="Enabled">
...
</HEAD>
<BODY>
<FORM Method="POST"
Action="http://MyDomainName/MyDestinationPage">
<INPUT Type="HIDDEN" Name="Correlation" Value="Enabled">
<INPUT Type="SUBMIT" Value="Click Here">
</FORM>
</BODY>
</HTML>
```

In this case, a hidden tag (Name="Correlation" and Value="Enabled") is used to specify that the transaction originating from the link must be monitored.

When the user selects this link, the following HTTP request is generated:

```
POST <SP>
http://MyDomainName/MyDestinationPage <SP>
HTTP_Version <CRLF>
<CRLF>
<CRLF>
```

The HTTP request is then modified (assuming that the domain name "MyDomainName" matches the filtering pattern) by inserting the field "CORR" (with the corresponding value "MyCorrelator"):

```
POST <SP>
http://MyDomainName/MyDestinationPage <SP>
HTTP_Version <CRLF>
CORR: "MyCorrelator" <CRLF>
<CRLF>
<CRLF>
```

The performance parameters measured with the process described above are then available to a system administrator (for example, after being consolidated on the collector server). Particularly, the correlators associated with every measured parameter are used to trace the correct child/parent relationship among the different transactions. For example, when a problem is experienced by the user a first level of detail allows the system administrator to identify the component of the system (client, server or network) causing the problem. The information relating to the corresponding sub-transactions can then be expanded in a top-down manner, until the true cause of the problem is precisely identified.

However, the concepts of the present invention are also valid when an application (consisting of the programs on each client and the programs on each server) performs an equivalent method. Similar considerations apply if the correlator is transmitted to the server in a different manner, if the web pages are replaced with equivalent documents, or if different (general and/or local) identifiers are used in the definition of the web page to enable the monitoring of the transactions. Alternatively, the monitoring agents are controlled in another way, the duration of one or more sub-transactions (under the control of corresponding applications) is measured on every server, the transaction involves multiple requests to different servers, and the like.

More generally, the present invention proposes a method of monitoring performance of distributed applications. The method starts with a client computer originating a request of service for a server computer. If the request meets at least one predefined condition, the measuring on the client computer of one or more performance parameters for a transaction corresponding to the request is enabled, and the request is updated by inserting a correlation identifier. The method continues transmitting the request to the server computer. If the request includes the correlation identifier, the measuring on the server computer of the performance parameter for a sub-transaction originating from the request is enabled. The sub-transaction is then executed. The method now involves associating the correlation identifier with the performance parameter measured on the server computer; moreover, the correlation identifier is also associated with the performance parameter measured on the client computer.

The method of the invention makes it possible to control the monitoring of distributed applications dynamically. It should be emphasized that this result is achieved directly filtering the actual requests that are originated on every client computer.

The devised solution provides a simple and flexible way for selecting the transactions to be monitored.

As a consequence, the tuning of the performance monitoring process is strongly facilitated. In this way, the transactions can be monitored selectively only when necessary; it is then possible to collect valuable information without substantially increasing the run-time overhead of the system.

The preferred embodiment of the invention described above offers further advantages.

Particularly, every request is intercepted by a module running on the client (which verifies whether the request meets the predefined conditions).

In this way, the process is completely opaque to the module originating the requests on the client computer; this feature is very useful when the source code of this module (for example, the browser installed on the client) cannot be changed.

Particularly, the same operations are recursively executed on one or more auxiliary servers.

The proposed solution is particularly advantageous when the transaction involves several interacting tiers working on different computers.

However, the solution according to the present invention leads itself to be implemented even updating the source code of the distributed application, or with transactions that are executed on a single server.

In a particular embodiment of the invention, the measuring is enabled when the address of the server matches a pre-defined pattern stored on the client.

This method can be used when all the requests directed to a specific set of servers have to be monitored.

In addition or in alternative, the measuring is enabled according to the document currently displayed on the client.

The proposed filtering scheme can be controlled centrally from the server, and it is immediately effective on every client requesting the document (without any intervention on the same).

A suggested choice for implementing this filtering scheme is to enable the measuring when a definition of the document includes a global enabling identifier.

This method can be used when the server provides a number of services, and only some of them need to be monitored.

In a different embodiment of the invention, the measuring is enabled when a definition of the link includes a local enabling identifier.

The proposed method provides a very selective filtering scheme.

However, the method according to the present invention leads itself to be implemented only with one or more of the above-described filtering schemes, or even with filters based on different criteria (for example, a geographical location of the client). Alternatively, the addresses, documents and/or links are filtered with different algorithms; for example, the servers to be monitored are selected by the access provider (even according to their IP addresses), or an additional filtering pattern is stored on the client for the URL of the documents to be monitored.

Advantageously, the solution according to the present invention is implemented with a computer program application, which is provided as a corresponding product stored on a suitable medium; the application consists of one or more programs installed on each client and one or more programs installed on each server. However, it should be noted that the different programs running on the clients or on the servers, and even the programs used on the clients to intercept the requests of service are suitable to be implemented and put on the market as stand-alone products (in order to be integrated into pre-existing systems).

Alternatively, each program is pre-loaded onto the harddisk, is sent to the respective computer through the Internet, is broadcast, or more generally is provided in any other form directly loadable into a working memory of the computer. However, the method according to the present invention leads itself to be carried out with an application having a different architecture, or even with a hardware structure (for example, integrated in a chip of semiconductor material).

Naturally, in order to satisfy local and specific requirements, a person skilled in the art may apply to the solution described above many modifications and alterations all of which, however, are included within the scope of protection of the invention as defined by the following claims

The invention claimed is:

1. A method of monitoring performance of distributed applications, comprising:
   originating, from a client computer, a service request to a server computer, wherein the originating comprises downloading a document from the server computer, displaying the document, and selecting a link in the document,
   in response to verifying that the request includes a predetermined keyword for enabling monitoring of transactions originating from the selected link in the downloaded document, enabling measuring, by an agent module on the client computer, of at least one performance parameter for a transaction corresponding to the request,
   generating a correlation identifier for the transaction at the client computer and associating the correlation identifier with the at least one performance parameter being measured on the client computer,
   updating the request by inserting the correlation identifier into the request to form a modified request,
   transmitting the modified request to the server computer,
   in response to receiving a result of the executing of the modified request on the server computer, logging the measured at least one performance parameter for the transaction at the client computer,
   in response to receiving, at the server computer, the modified request including the correlation identifier, enabling measuring, by an agent module on the server computer, of at least one performance parameter for a sub-transaction originating from the modified request,
   associating the correlation identifier with the at least one performance parameter being measured on the server computer,
   executing the sub-transaction,
   generating a result of the executing of the sub-transaction,
   logging the measured at least one performance parameter for the sub-transaction in a log at the server computer,
   transmitting the result of executing the sub-transaction including the correlation identifier to the client computer,
   originating, from the server computer at least one further service request to at least one further server computer,
   generating a further correlation identifier for the sub-transaction at the server computer and associating the further correlation identifier with the at least one performance parameter being measured on the server computer,
   updating the at least one further request by inserting the further correlation identifier into the at least one further request to form a modified further request,
   transmitting each at least one modified further request to a corresponding further server computer,
   in response to receiving a result of the executing of the modified further request on the further server computer, logging the measured at least one performance parameter for the sub-transaction at the server computer,
   in response to receiving, at the further server computer, the further request including the further correlation identifier, enabling measuring, by an agent module on the further server computer of at least one performance parameter for a further sub-transaction originating from the modified further request,
   associating the further correlation identifier with the at least one performance parameter being measured on the further server computer,
   executing the further sub-transaction,
   generating a result of executing the further sub-transaction,
   logging the measured at least one performance parameter for the further sub-transaction in a log at the further server computer, and
   transmitting the result of executing the further sub-transaction including the further correlation identifier to the server computer.

2. A computer program product comprising a computer program directly loadable into a working memory of a client computer in a data processing system with a distributed architecture for performing a method of monitoring performance of distributed applications, the computer program product comprising:
   instructions for originating a service request to a server computer, wherein the originating comprises downloading a document from the server computer, displaying the document, and selecting a link in the document, in response to verifying that the request includes a predetermined keyword for enabling monitoring of transactions originating from the selected link in the downloaded document, instructions for enabling measuring on the client computer of at least one performance parameter for a transaction corresponding to the request, instructions for generating a correlation identifier for the transaction at the client computer and associating the correlation identifier with the at least one performance parameter being measured on the client computer, instructions for updating the request by inserting the correlation identifier into the request to form a modified request, instructions for transmitting the modified request to the server computer, instructions for logging, in response to receiving a result of the executing of the modified request on the server computer, the measured at least one performance parameter for the transaction at the client computer, in response to receiving, at the server computer, the modified request including the correlation identifier, instructions for enabling measuring, by an agent module on the server computer, of at least one performance parameter for a sub-transaction originating from the modified request, instructions for associating the correlation identifier with the at least one performance parameter being measured on the server computer, instructions for executing the sub-transaction, instructions for generating a result of the executing of the sub-transaction, instructions for logging the measured at least one performance parameter for the sub-transaction in a log at the server computer, instructions for transmitting the result of executing the sub-transaction including the correlation identifier to the client computer, instructions for originating, from the server computer at least one further service request to at least one further server computer, instructions for generating a further correlation identifier for the sub-transaction at the server computer and associating the further correlation identifier with the at least one performance parameter being measured on the server computer, instructions for updating the at least one further request by inserting the further correlation identifier into the at least one further request to form a modified further request, instructions for transmitting each at least one modified further request to a corresponding further server computer, in response to receiving a result of the executing of the modified further request on the further server computer, instructions for logging the measured at least one performance parameter for the sub-transaction at the server computer, in response to receiving, at the further server computer, the further request including the further correlation identifier, instructions for enabling measuring, by an agent module on the further server computer of at least one performance parameter for a further sub-transaction originating from the modified further request, instructions for associating the further correlation identifier with the at least one performance parameter being measured on the further server computer, instructions for executing the further sub-transaction, instructions for generating a result of executing the further sub-transaction, instructions for logging the measured at least one performance parameter for the further sub-transaction in a log at the further server computer, and instructions for transmitting the result of executing the further sub-transaction including the further correlation identifier to the server computer.

3. A data processing system with a distributed architecture for monitoring performance of distributed applications comprising at least one client computer comprising a hardware data processor and at least one server computer comprising another hardware data processor, wherein each at least one client computer comprises a browser module running on the client computer for originating a service request to a server computer, wherein the originating comprises downloading a document from the server computer, displaying the document, and selecting a link in the document, a sensor module running on the client computer for enabling measuring on the client computer of at least one performance parameter for a transaction corresponding to the request, for generating a correlation identifier for the transaction at the client computer, for associating the correlation identifier with the at least one performance parameter being measured on the client computer, and for updating the request by inserting the correlation identifier into the request to form a modified request in response to verifying that the request includes a predetermined keyword for enabling monitoring of transactions originating from the selected link in the downloaded document, a network module running on the client computer for transmitting the modified request to the server computer, and in response to receiving a result of the executing of the modified request on the server computer, the measured at least one performance parameter for the transaction is logged at the client computer;

an agent module on the server computer for enabling measuring of at least one performance parameter for a sub-transaction originating from the modified request in response to receiving, at the server computer, the modified request including the correlation identifier, a server module running on the server computer for associating the correlation identifier with the at least one performance parameter being measured on the server computer, for executing the sub-transaction, for generating a result of the executing of the sub-transaction, and for logging the measured at least one performance parameter for the sub-transaction in a log at the server computer, and a network module for transmitting the result of executing the sub-transaction including the correlation identifier to the client computer; wherein the server module on the server computer originates at least one further service request to at least one further server computer, generates a further correlation identifier for the sub-transaction at the server computer and associating the further correlation identifier with the at least one performance parameter being measured on the server computer, and updates the at least one further request by inserting the further correlation identifier into the at least one further request to form a modified further request, wherein the network module on the server computer transmits each at least one modified further request to a corresponding further server computer, wherein the server module logs the measured at least one performance parameter for the sub-transaction at the server computer in response to receiving a result of the executing of the modified further request on the further server computer, wherein the further server computer receives the further request including the further correlation identifier, enables measuring of at least one performance parameter for a further sub-transaction originating from the modified further request, associates the further correlation identifier with the at least one performance parameter being measured on the further server computer, executes the further sub-transaction, generates a result of executing the further sub-transaction, logs the measured at least one performance parameter for the further sub-transaction in a log at the further server computer, and transmits the result of executing the further sub-transaction including the further correlation identifier to the server computer.

* * * * *